(No Model.)
T. H. HICKS.
ELECTRIC MACHINE.
No. 465,853. Patented Dec. 29, 1891.
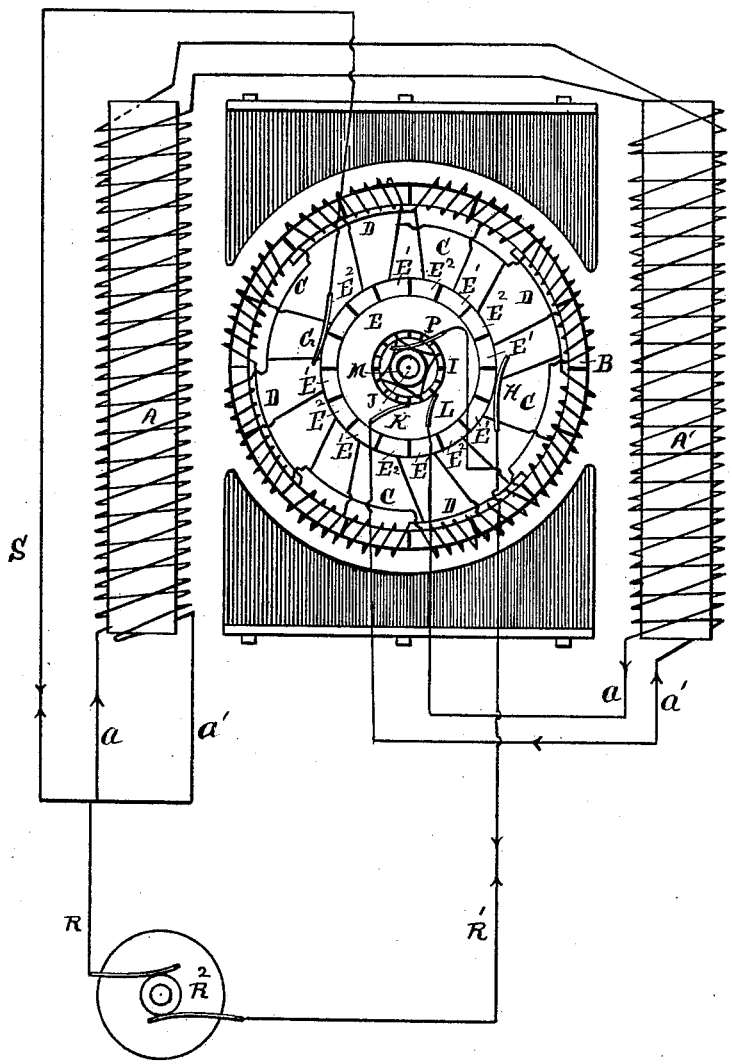
Witnesses
John Schuman
Charles F. Salow.
Inventor
Thomas Hammill Hicks.
By his Attorney
Newell S. Wright.

UNITED STATES PATENT OFFICE.

THOMAS HAMMILL HICKS, OF DETROIT, MICHIGAN, ASSIGNOR OF TWO-THIRDS TO GEORGE F. CASE AND E. D. RICHMOND, OF SAME PLACE.

ELECTRIC MACHINE.

SPECIFICATION forming part of Letters Patent No. 465,853, dated December 29, 1891.

Application filed May 9, 1890. Serial No. 351,133. (No model.)

*To all whom it may concern:*

Be it known that I, THOMAS HAMMILL HICKS, a subject of the Queen of Great Britain, residing at Detroit, in the county of Wayne, State of Michigan, have invented a certain new and useful Improvement in an Electric Machine; and I declare the following to be a full, clear, and exact description of the same, such as will enable others skilled in the art to which it appertains to make and use the same, reference being had to the accompanying drawing, which forms a part of this specification.

My invention relates to certain new and useful improvements in the construction of electric machines, and has for its objects, first, a construction whereby motors can be run by alternating currents as successfully as by continuous currents of electricity, and, second, whereby multipolar generators can be made to generate continuous currents of high electro-motive force without any danger of short-circuiting the current impulses between the sections of the commutator. These objects I carry out, as more fully hereinafter specified and claimed and disclosed in the accompanying drawing, which is a diagram view of a device embodying my invention.

A and A' represent the field-magnet cores of an electric machine, which I wind with two distinct and separate conductors $a$ and $a'$, wound either in reverse directions or in the same direction and then connected in such a manner as to produce similar effects as if wound in reverse direction.

B denotes the armature of the machine, which may be wound with either one or two separate conductors, depending upon its type. A Gramme or a Siemens armature I wind with two separate conductors C and D, as shown in the drawing, one circuit traversed by current impulses of one direction and the other circuit traversed by current impulses of the opposite direction, and each circuit having its own separate collector $E'$ and $E^2$, said collectors preferably alternately arranged in pairs and appear in the drawing assembled in an annular collector E in the form of an ordinary commutator used in a Siemens or Gramme type. There are, it will be seen, double the number of sections in the collector E as there are changes in the current impulses of one of the armature-circuits. These collectors, it should be understood, are not commutators, but are designed to collect the impulses sent in opposite directions and send them through the appropriate field-conductors.

In constructing a motor of the "multipolar" type—such, for example, as the "Lontin"—I only require one winding on the armature; but if the device is to be used as a generator I then use two distinct armature-windings. The two armature-windings are only in use alternately with each other. Therefore, by arranging their two collectors in a single collecting device, as shown in the drawing, one set of brushes G and H can collect or distribute the current impulses for the two armature-circuits, pulsatory currents of one direction traveling through one circuit and those of the opposite direction traveling through the other circuit when the speed of the armature produces synchronous changes with the pulsations of the alternating-current dynamo from which the motor is supplied. The two field-circuits $a$ and $a'$ are, like the armature-circuits, in use alternately with each other, current impulses of one direction traveling through one field-conductor, and those of the other direction traveling through the other field-conductor, when the above synchronous changes are preserved, thereby maintaining constant magnetic poles the same as if a continuous current was used. It is therefore necessary to provide, also, means for separating the impulses of opposite direction from each other for the field-circuits. For this purpose I accordingly attach a separate distributer I on the shaft J of the armature having independent brushes K L, from which the field-circuits are supplied with impulses synchronously with the changing of the impulses in the armature-circuit, the armature and collectors being all mounted on the same shaft J. The current selector and distributer I for the two field-circuits is supplied with a current from the main line through the brush P, which rests upon the ring M, the latter being electrically connected with every alternate section of the segments forming the selector and distributer I, every alternate section of which is simply a blank used to support the brushes while passing from one section to another.

The action of the device is as follows: If used as a motor on an alternating circuit when the current is first turned on, the motor, the field, and the armature circuits are traversed by alternating currents until the speed of the armature is sufficient to change the circuits synchronously with the alternating impulses, at which time the field-magnets will maintain constant magnetic polarity, the same as if a continuous current was used. This is due to the fact that all of the current impulses of one direction pass through the conductors wound in one direction and all of the current impulses of the reverse direction pass through the conductors which are wound in the other direction. When I use a motor of the Lontin type with only one winding on the armature, the field-circuits will be the same and operated the same as before described; but if this type is used as a generator with two windings on the armature the windings and actions will be the same as with a Siemens or Gramme.

R and R' are the conductors connected with the dynamo R². A portion of the current therefrom is shunted through the armature, as by the conductor S, returning through one of the armature-conductors, as indicated at R'. Another portion of the current is shunted alternately through the field-circuits, as above described. As shown in the drawing, the brush K is just leaving one of the sections of the selector and distributer I, cutting the corresponding circuit of the field out, while the other brush L is just entering said section. Instead of using the current direct from the full electro-motive force from the dynamo, the field and armature can be supplied from a secondary circuit.

Shunts from the two brushes K and L may be taken off to supply other electric devices.

What I claim as my invention is—

1. In an electric machine, field-cores each wound with two conductors, one conductor traversed by a current impulse in one direction, and the other conductor traversed by a current impulse of opposite direction and terminating in separate brushes, having in combination therewith a current selector and distributer having sliding contact with said brushes, one of said brushes collecting the impulses of one direction and sending them through one of the field-conductors, and the other brush collecting the impulses of the opposite direction and sending them through the other field-conductor, substantially as set forth.

2. In an electric machine, an armature provided with two separate circuits, each having a separate collector, said circuits traversed by current impulses of opposite directions, substantially as set forth.

3. In an electric machine, an armature provided with two separate circuits traversed by current impulses of opposite directions, said armature having in combination therewith separate current-collectors, substantially as set forth.

4. In an electric machine, an armature provided with two separate circuits traversed by current impulses of opposite directions, said armature having in combination therewith separate current-collectors E' E², alternately arranged in pairs in an annular collector E, substantially as set forth.

5. In an electric machine, an armature provided with two separate circuits traversed by current impulses of opposite directions, said armature having in combination therewith separate current-collectors made to rotate with the armature, substantially as set forth.

6. In an electric machine, the combination, with field-cores wound with two conductors, each traversed by current impulses of opposite directions, of an armature provided with two separate circuits, each having a separate collector and a current selector and distributer, producing pulsations through the field-cores synchronous with those of the armature-circuits, substantially as set forth.

7. In an electric machine, the combination, with field-cores each wound with two conductors, one conductor traversed by a current impulse of one direction and the other conductor traversed by a current impulse of opposite direction, of an armature, and a current selector and distributer producing pulsations through the fields synchronous with the alternations through the armature, substantially as set forth.

8. In an electric machine, the combination, with an armature having two circuits, each provided with a separate rotatable collector, of a current selector and distributer rotatable synchronously with said collector, and brushes giving off pulsatory currents in opposite directions from said selector and distributer, substantially as set forth.

9. In an electric machine, the combination, with an armature provided with two separate circuits traversed by current impulses of opposite directions, each provided with separate collector bars or segments, said bars or segments alternately arranged in an annular collector, whereby one set of brushes may collect the pulsations of opposite directions from the sets of collector bars or segments, substantially as set forth.

In testimony whereof I sign this specification in the presence of two witnesses.

THOMAS HAMMILL HICKS.

Witnesses:
ROSWELL HARRIS,
N. S. WRIGHT.